United States Patent [19]
Billing

[11] Patent Number: 5,244,869
[45] Date of Patent: Sep. 14, 1993

[54] SUPERCONDUCTING MICROWAVE FREQUENCY SELECTIVE FILTER SYSTEM

[75] Inventor: John F. Billing, Pasadena, Md.

[73] Assignee: Westinghouse Electric Corp., Pittsburgh, Pa.

[21] Appl. No.: 601,555

[22] Filed: Oct. 23, 1990

[51] Int. Cl.$^5$ .............................................. H04B 1/18
[52] U.S. Cl. ..................................... 505/1; 505/866; 333/99. S; 333/101; 333/132; 455/277.1; 455/280
[58] Field of Search ...................... 333/99 S, 202, 101, 333/132, 174; 455/275–278, 280; 370/38; 505/1, 700, 701, 866

[56] References Cited

U.S. PATENT DOCUMENTS

| | | | |
|---|---|---|---|
| 2,709,206 | 5/1955 | Ferguson | 333/174 X |
| 2,719,272 | 9/1955 | Gannett | 333/170 |
| 3,564,546 | 2/1971 | Barney et al. | 333/99 S X |
| 3,714,655 | 1/1973 | Ross et al. | 342/373 |
| 3,855,556 | 12/1974 | Hartmann | 310/313 R X |
| 3,858,118 | 12/1974 | Daniel | 455/187 |
| 4,101,836 | 7/1978 | Craig et al. | 455/277 |
| 4,129,839 | 12/1978 | Galani et al. | 333/128 |
| 4,435,841 | 3/1984 | Dobrovolny | 455/180 |
| 4,480,338 | 10/1984 | Dobrovolny | 455/188 |
| 4,688,259 | 8/1987 | Edridge | 455/12 |
| 4,736,171 | 4/1988 | Minarik | 333/101 X |
| 4,763,089 | 8/1988 | Pon | 333/202 |
| 4,827,229 | 5/1989 | Sabet-Payman et al. | 333/187 |
| 4,970,479 | 11/1990 | Landt et al. | 333/202 X |

FOREIGN PATENT DOCUMENTS 292715  11/1988  Japan ................................. 333/193

OTHER PUBLICATIONS

Bybokas, J. and Hammond, B.; "High Temperature Superconductors"; *Microwave Journal;* Feb. 1990; pp. 127–138.

Primary Examiner—Benny T. Lee
Attorney, Agent, or Firm—W. G. Sutcliff

[57] ABSTRACT

A superconducting microwave selective filter system having a superconducting filter connected to receive RF signals and perform filtering before the RF signals are applied to nonlinear circuitry such as receiver protectors and low noise amplifiers. A single pole n throw point switch selects a desired one of the filters to provide a receiver with a desired frequency, such as an active radar frequency. The low loss and high dynamic range of a superconducting filter permits these filters to be employed in the front end of the system before system nonlinear circuitry.

5 Claims, 3 Drawing Sheets

SUPERCONDUCTING MICROWAVE FREQUENCY SELECTIVE FILTER SYSTEM

BACKGROUND OF THE INVENTION

The present invention relates to microwave filters, and more particularly to frequency selective superconducting microwave filters. Many electronic systems, such as radar and communication systems operate over a wide range of microwave frequencies. In fact, many radar and communications systems operate in what is known as a frequency hopping or a frequency agile manner over very wide microwave (i.e., RF) bandwidths. The bandwidth can vary up to an octave or more and the frequencies can range from the S to Ku bands.

FIG. 1 illustrates the organization of a system's RF bandwidth 10. Radar agile frequency slots 15 are distributed throughout the system RF bandwidth 10. Interfering signals 20 are shown as black bars in FIG. 1, and reference numeral 25 identifies a particular radar signal. If the interfering signals 20 have sufficient amplitude and/or are sufficiently close to a particularly radar signal 25, interference may occur. The interference may result from, for example, intermodulation between two or more of the interfering signals 20, or by cross modulation between an interfering signal 20 and a particular radar signal 25.

Generally, radar and communications systems include nonlinear circuits that are positioned in a signal path prior to filtering that defines the instantaneous system bandwidth. These nonlinear circuits include, for example, low noise amplifiers and mixers. Increasing the linearity of such circuits tends to eliminate the effect of cross modulation between an interfering signal 20 and a particular radar signal 25. Avoiding the effects of cross modulation can also be achieved by preselecting the signal received by the system. Preselection can be achieved through the use of a switchable filter bank or a tunable filter.

Increasing the linearity of the nonlinear circuits, however, tends to increase their power consumption and cause a loss of sensitivity in these circuits. This is because the increased linearity is normally achieved by increasing the third order intercept point of these circuits. There is a direct relationship between the noise figure of a circuit and the third order intercept point of the circuit. Thus, increasing the linearity of the nonlinear circuits is not a desirable solution in most radar and communications systems.

Preselection or the use of filters ahead of the nonlinear circuits requires that the filters have very low loss, e.g., approximately 1 dB or less. Such filters would have a minimal impact on the sensitivity of the system. The filters must also have a very large dynamic range and a minimal bandwidth; that is, a bandwidth wide enough to pass a particular radar signal 25 and to reject interfering signals 20. Generally, this requires that the filters have a 1 to 2 percent bandwidth. Currently, only waveguide filters are able to meet these requirements. Waveguide filters, however, are physically large and expensive.

SUMMARY OF THE INVENTION

It is an object of the present invention to provide a low loss, high Q microwave frequency selective filter system.

It is another object of the present invention to provide a compact, low loss, high Q microwave frequency selective filter system.

It is still a further object of the present invention to provide a superconducting microwave frequency selective filter system.

To achieve the above and other objects, the present invention provides a superconducting microwave frequency selective filter system comprising superconducting filter means for receiving respective RF signals and for providing corresponding filtered RF signals; nonlinear circuit means, operatively connected to the superconducting filter means, for processing the filtered RF signals; selector means for selectively providing the process RF signals in accordance with a control signal; and control means for providing the control signal.

DESCRIPTION OF THE PREFERRED EMBODIMENTS

Figure 2:
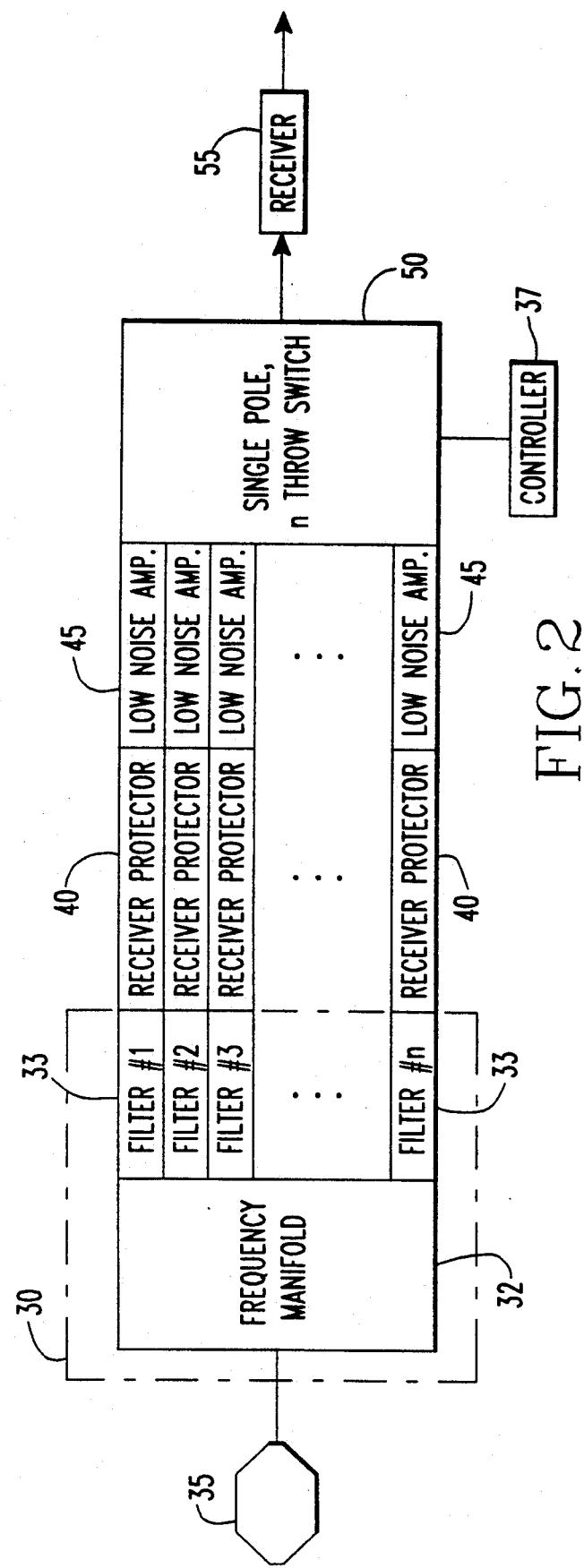
FIG. 2 is a schematic block diagram of a microwave frequency selective filter system embodying the present invention.

FIG. 2 is a schematic block diagram of a microwave frequency selective filter system embodying the present invention. In FIG. 2 a superconducting filter bank 30 receives RF signals from an antenna 35. The RF signals pass through a low loss frequency manifold 32. To ensure large dynamic range, the manifold includes only passive transmission line elements and does not contain active or other potentially nonlinear devices. A basic manifold would comprise short transmission lines fanning out to each of the filters 33 from a single point such as the antenna 35. In such a structure, each of the lines should be less than one quarter wavelength at the center frequency of the particular filter. Another approach to distributing a microwave signal is described in J. David Rhodes and R. Levy in IEEE Transactions on Microwave Theory and Techniques, Vol. MTT-27, No. 2, February 1979 which is herein incorporated by reference.

The manifolded RF signals are then applied to a bank of superconducting filters 33. Each of the filters 33 provides a filtered signal to a corresponding receiver protector 40. Each of the receiver protectors 40 functions to protect a receiver (e.g., receiver 55) from large synchronous signals. Large synchronous signals comprise, for example, a radar's own transmitted signal. In such a case, the receiver protector would be turned on in synchronism with the transmitted signal to cause such a large unwanted signal to be either absorbed or reflected back to the antenna 35. A secondary function of the receiver protector 40 is to protect the receiver from large asynchronous signals. In such cases, the receiver protectors 40 limit the level of an unwanted asynchronous signal. As will be recognized by those skilled in the art, the levels that must be protected against depend upon the system parameters and the particular antenna 35. The levels can range from low power protectors (e.g., 20 watts) that employ diodes, to high power protectors (1 kW) that employ gas plasma discharge or multipactors.

The respective outputs of the receiver protectors 40 are applied to corresponding low noise amplifiers 45. The low noise amplifiers 45 provide low noise gain and effectively establish the receiver noise figure. Typically, at X band (10 GHz) using GaAs MESFETs or HEMT devices, the gain of the low noise amplifiers 45 is in the range of 10 dB to 30 dB, and the receiver noise figure is in the range of 2 dB or less.

A switch 50 is controlled by the controller 37 and applies the output of one of the low noise amplifiers 45 to the receiver 55. The switch 50 comprises a single pole, n throw point switch (where n is the number of filters), and can comprise any standard commercially available microwave PIN diode switch. In a frequency agile radar system, the controller 37 would control the switch 50 so as to connect a particular filter 33, receiver protector 40, low noise amplifier 45 combination that corresponds to the active receiver frequency to the receiver 55. The controller 37 would therefore switch the receiver 55 to any one of the filters 33, receiver protector 40 and low noise amplifier 45 combinations in synchronism with operation of the radar system. The controller 37 could comprise, for example, a simple decoder that receives an address or code from the radar system and activates a particular signal line to select the desired filter 33, receiver protector 40 and low noise amplifier 45 combination. In other systems, the controller 37 could simply sequence the switch 50 through the individual filter, receiver protector and low noise amplifier (33, 40, 45) combinations.

Figure 1:
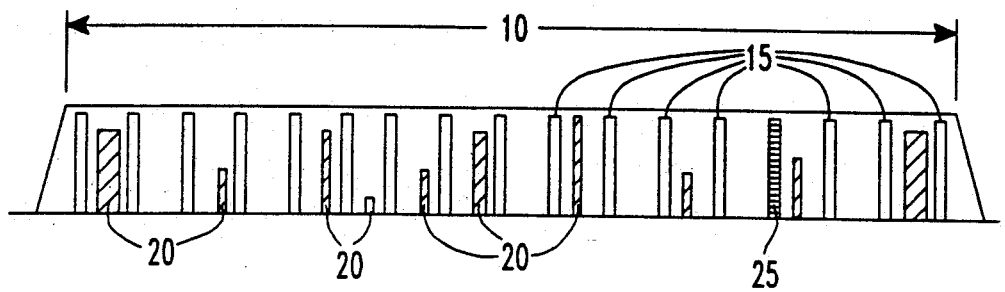
FIG. 1 schematically illustrates a system bandwidth.
Figure 3:
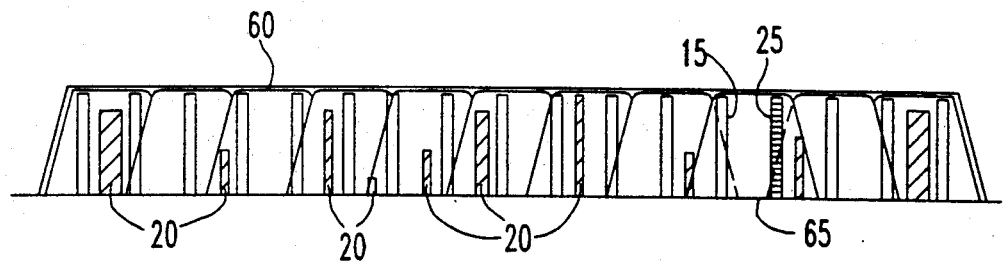
FIG. 3 illustrates the frequency selective feature of the FIG. 2 system.

FIG. 3 illustrates the frequency selective feature of the FIG. 2 system. In FIG. 3, the system bandwidth is covered by a series of narrow band filter characteristics 60. The shaded characteristics shown in FIG. 3 represent filters 33 that are not activated. A narrow band filter characteristic 65 (shown in FIG. 3 as an unshaded characteristic) filters out the interfering signals 20 and provides the corresponding receiver protector 40 with the radar signal 25.

Figure 4A:
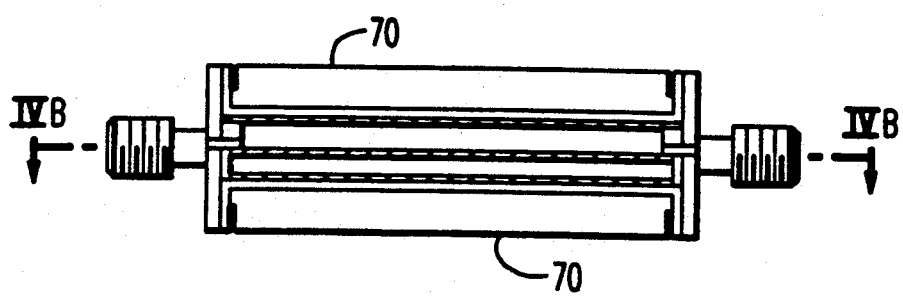
FIGS. 4A and 4B schematically illustrate a filter usable in the FIG. 2 system.
Figure 4B:
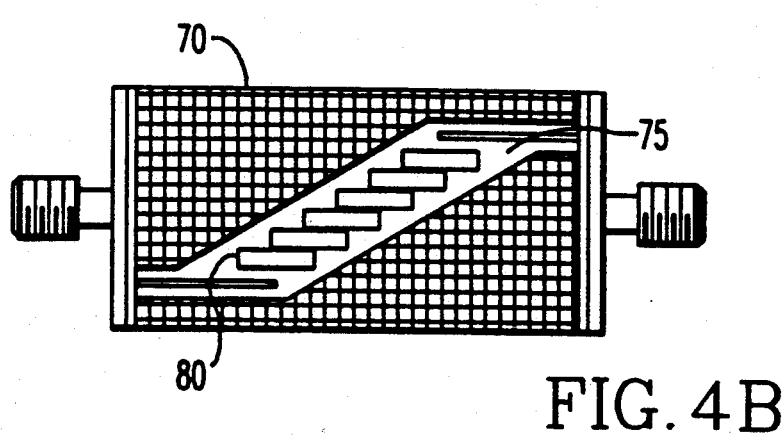

FIGS. 4A and 4B schematically illustrate a filter usable in the FIG. 2 system. In accordance with the preferred embodiment of the present invention, the filters 33 shown in FIG. 2 comprise superconducting stripline coupled line filters. These filters can comprise either low temperature superconductors (LTS) such as Nb or high temperature superconductors (HTS) such as YBCO.

Superconducting stripline coupled line filters have unloaded Q's on the order of 10,000. Since such filters are passive transmission line type devices, they have very low loss (e.g., in the range of less than 1 dB) and a very high dynamic range. With losses of less than 1 dB, these filters can be inserted ahead of nonlinear circuits such as the receiver protector 40, low noise amplifier 45 and receiver 55, with minimal impact on the sensitivity of the system. The particular structure shown in FIG. 2 comprises a X band coupled line stripline filter. The illustrative filter is a Chebychev filter designed to have 6 poles, a 1 percent bandwidth and a ripple of 0.1. Referring to FIGS. 4A and 4B, a stainless steel plate 70 supports a sapphire substrate 75. A series of superconducting stripes 80 are formed on the sapphire substrate 75 to construct the Chebychev filter. The superconducting stripes 80 can comprise a low temperature superconductor such as niobium (Nb) which operates at, for example, 4° K. The superconducting stripes 80 can also comprise a high temperature superconductor such as YBCO which operates in the range 70°–75° K. Typical dimensions for the filter shown in FIG. 4B are approximately 0.5 inch×0.75 inch.

The superconducting filter can be cooled by any commercially available cooling system. Commercially available cooling systems are manufactured by, for example, Air Products and Chemicals Corporation, CTI-Cryogenic Corporation and Cryosystems, Inc.

The foregoing is considered as illustrative only of the principles of the invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

We claim:

1. A superconducting microwave frequency selective filter system, comprising:

a manifold having an input for receiving input RF signals and outputs for distributing respective RF output signals:

a plurality of superconducting filters respectively having inputs connected to the respective outputs of the manifold and each filter having a corresponding output;

a plurality of receiver protetors respectively connected to corresponding outputs of ones of said superconducting filters;

a plurality of low noise amplifiers each having an input respectively connected to corresponding ones of said receiver protectors and each having a corresponding output;

a single pole, n throw point switch having respective ones of the n throw points connected to corresponding outputs of said low noise amplifiers; and control means coupled to the single pole for connecting a selected one of the n throw points of a desired one of the said low noise amplifiers.

2. A superconducting microwave frequency selective filter system, comprising:

superconducting filter means having an input for receiving input RF signals and outputs for providing filtered RF signals, said superconducting filter means comprising:

a manifold having an input connected to said filter means input for receiving the input RF signals, and outputs for distributing each respective RF output signal; and a plurality of superconducting filters respectively having inputs connected to the respective outputs of the manifold and each filter having a corresponding output; wherein said filter system further comprises:

circuit means operatively connected to each output of said superconducting filter means, for processing the filtered RF signals;

selector means operatively connected to the circuit means for selectively outputting one of the processed filtered RF signals in accordance with a control signal applied thereto; and control means operatively connected to the selector means for providing the control signal.

3. A superconducting microwave frequency selective filter system according to claim 2, wherein said selector means comprises:

a single pole, n throw point switch, operatively connected to said circuit means and having respective ones of the n throw points corresponding to ones of said processed filtered RF signal.

4. A superconducting microwave frequency selective filter system according to claim 3, wherein said circuit means is nonlinear and comprises:

a plurality of receiver protectors respectively connected to corresponding outputs of ones of said superconducting filters and limiting the filtered RF signals; and a plurality of low noise amplifiers each having an input operatively connected to corresponding ones of said receiver protectors, and each having an output operatively connected to respective ones of the n throw points of said single pole, n throw point switch.

5. A superconducting microwave selective filter system according to claim 4, wherein each of said superconducting filters is characterized by a respective center frequency.

* * * * *